(12) United States Patent
Yoshimoto et al.

(10) Patent No.: US 9,501,219 B2
(45) Date of Patent: Nov. 22, 2016

(54) 2D LINE DATA CURSOR

(75) Inventors: Brandon Yoshimoto, Los Angeles, CA (US); Hugh Zhang, Winchester, MA (US); Prashant Singh, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 433 days.

(21) Appl. No.: 13/439,630

(22) Filed: Apr. 4, 2012

(65) Prior Publication Data

US 2013/0187948 A1    Jul. 25, 2013

Related U.S. Application Data

(60) Provisional application No. 61/590,696, filed on Jan. 25, 2012.

(51) Int. Cl.
*G06T 11/20* (2006.01)
*G06F 3/0488* (2013.01)

(52) U.S. Cl.
CPC .................. *G06F 3/04883* (2013.01)

(58) Field of Classification Search
CPC ..................... G06T 11/206; G06F 3/0481
USPC .......................................... 345/440
See application file for complete search history.

(56) References Cited

U.S. PATENT DOCUMENTS

| | | | |
|---|---|---|---|
| 5,917,499 A | 6/1999 | Jancke et al. | |
| 7,512,875 B2 | 3/2009 | Davis | |
| 2012/0198351 A1* | 8/2012 | Lee et al. | 715/744 |
| 2013/0009963 A1* | 1/2013 | Albrecht | 345/473 |
| 2013/0145244 A1* | 6/2013 | Rothschiller et al. | 715/212 |

OTHER PUBLICATIONS

Jon Peltier, Using worksheet controls to highlight selected data in an excel chart, http://peltiertech.com/WordPress/interactive-controls-to-highlight-selected-data-in-an-excel-chart/, Jan. 11, 2012.*
Highcharts JS software package: http://www.highcharts.com/products/highcharts with version on Jan. 20, 2012.*
Graemerae "Multiple Data in single tooltip" Highslide Software, retrieved from http://highslide.com/forum/viewtopic.php?f=9&t=5605 on Dec. 28, 2011, 9 pages.
jsfiddle.net Alpha, "Jsfiddle Element Stacks," retrieved from http://jsfiddle.net/phhm9/ on Dec. 28, 2011, 1 page.
Quinn, Shawn, "Interface ToolTipFormatter (Moxie Apps GWT Highcharts 1.1.2 API," retrieved from http://www.moxiegroup.com/moxieapps/gwt-highcharts/apidocs/org/moxieapps/gwt/highcharts/client/ToolTipFormatter.html on Dec. 28, 2011, 2 pages.
Stack Overflow, "flex programmatically show tooltip chart," Welcome to Q&A for professional and enthusiast programmers—check out the FAQ, retrieved from http://stackoverflow.com/questions/3516549/flex-programmatically-show-tooltip-chart on Dec. 28, 2011, 1 page.

* cited by examiner

*Primary Examiner* — Devona Faulk
*Assistant Examiner* — Jin Ge
(74) *Attorney, Agent, or Firm* — Kilpatrick Townsend & Stockton LLP

(57) ABSTRACT

Various arrangements for displaying a value of a data point on a graph are presented. The graph that illustrates a plurality of datasets may be presented. Input may be received from a user that indicates a point on the graph. Along a line parallel to an axis that extends through the point on the graph indicated by the user input, a dataset from the plurality of datasets may be identified. The value for the data point of the dataset that corresponds to an intersection of the line parallel to the axis and the visual representation of the dataset may be determined. The value for the data point may be displayed.

18 Claims, 10 Drawing Sheets

2D LINE DATA CURSOR

CROSS-REFERENCES TO RELATED APPLICATIONS

This application claims priority from U.S. Provisional Patent Application No. 61/590,696, filed Jan. 25, 2012, entitled "2D Line Data Cursor," which is hereby incorporated by reference, as if set forth in full in this document, for all purposes.

BACKGROUND

Some mobile devices, such as cellular phones, tend to be small and use touchscreen-based user interfaces. If a user is viewing a graph that contains graphical representations of multiple datasets, it may be difficult to select a particular dataset and/or a particular data point of the dataset using the touchscreen-based user interface.

SUMMARY

Various arrangements for interacting with a graph are presented. In some embodiments, a computer-implemented method for displaying a value of a data point on a graph are presented. The method may include presenting the graph that illustrates a plurality of datasets. Each of the plurality of datasets may be visually represented on the graph. The method may include receiving a user input of a point on the graph. The method may include identifying, along a line parallel to an axis of the graph, a dataset from the plurality of datasets. The line may pass through the point on the graph indicated by the user input. A graphical representation of the dataset may be closest to the point along the line than other datasets of the plurality of datasets. The method may include retrieving the value for the data point of the dataset that corresponds to an intersection of the line parallel to a y-axis and the graphical representation of the dataset. The method may include displaying the value for the data point.

Embodiments of such a method may include one or more of the following: Presenting the graph that illustrates the plurality of datasets may be performed using a touchscreen interface configured to receive touch input in a region displaying the graph. The user input of the point on the graph may be received from a user via the touchscreen interface. The method may include deemphasizing display of each dataset of the plurality of datasets besides the dataset after identifying, along the line parallel to the axis of the graph, the dataset from the plurality of datasets. The method may include displaying the line parallel to the axis of the graph. Displaying the value for the data point may comprise not displaying values for any other data point while the value is displayed. Retrieving the value for the data point of the dataset that corresponds to the intersection of the line parallel to the axis of the graph and the graphical representation of the dataset may comprise identifying the data point of the dataset closest to the intersection. Retrieving the value for the data point of the dataset that corresponds to the intersection of the line parallel to the axis and the graphical representation of the dataset may comprise determining a value for the intersection. The touchscreen interface may be a cellular phone.

In some embodiments, a computer program product residing on a non-transitory processor-readable medium for displaying a value of a data point on a graph is presented. The computer program product may comprise processor-readable instructions configured to cause a processor to cause the graph to be presented that illustrates a plurality of datasets. Each of the plurality of datasets may be visually represented on the graph. The computer program product may comprise processor-readable instructions configured to cause the processor to receive a user input of a point on the graph. The computer program product may comprise processor-readable instructions configured to cause the processor to identify, along a line parallel to an axis of the graph, a dataset from the plurality of datasets. The line may pass through the point on the graph indicated by the user input. A graphical representation of the dataset may be closest to the point along the line than other datasets of the plurality of datasets. The computer program product may comprise processor-readable instructions configured to cause the processor to retrieve the value for the data point of the dataset that corresponds to an intersection of the line parallel to a y-axis and the graphical representation of the dataset. The computer program product may comprise processor-readable instructions configured to cause the processor to cause the value for the data point to be displayed.

Embodiments of such a computer program product may include one or more of the following: the processor-readable instructions configured to cause the processor to cause the graph to be presented that illustrates the plurality of datasets may be performed using a touchscreen interface configured to receive touch input in a region displaying the graph. The user input of the point on the graph may be received from a user via the touchscreen interface. The processor-readable instructions may be further configured to cause the processor to deemphasize display of each dataset of the plurality of datasets besides the dataset after identifying, along the line parallel to the axis of the graph, the dataset from the plurality of datasets. The processor-readable instructions may be further configured to cause the processor to cause the line parallel to the axis of the graph to be displayed. Displaying the value for the data point may comprise not displaying values for any other data point while the value is displayed. The processor-readable instructions configured to cause the processor to retrieve the value for the data point of the dataset that corresponds to the intersection of the line parallel to the axis of the graph and the graphical representation of the dataset may comprise processor-readable instructions configured to cause the processor to identify the data point of the dataset closest to the intersection. The processor-readable instructions configured to cause the processor to retrieve the value for the data point of the dataset that corresponds to the intersection of the line parallel to the axis and the graphical representation of the dataset may comprise processor-readable instructions configured to cause the processor to determine a value for the intersection. The touchscreen interface may be a cellular phone.

In some embodiments, a system for displaying a value of a data point on a graph is presented. The system may include a processor. The system may include a memory communicatively coupled with and readable by the processor and having stored therein processor-readable instructions. When executed by the processor, the processor-readable instructions may cause the processor to cause the graph to be presented that illustrates a plurality of datasets. Each of the plurality of datasets may be visually represented on the graph. When executed by the processor, the processor-readable instructions may cause the processor to receive a user input of a point on the graph. When executed by the processor, the processor-readable instructions may cause the processor to identify, along a line parallel to an axis of the graph, a dataset from the plurality of datasets. The line passes through the point on the graph indicated by the user input. A graphical representation of the dataset may be closest to the point along the line than other datasets of the plurality of datasets. When executed by the processor, the processor-readable instructions may cause the processor to retrieve the value for the data point of the dataset that corresponds to an intersection of the line parallel to a y-axis and the graphical representation of the dataset. When executed by the processor, the processor-readable instructions may cause the processor to cause the value for the data point to be displayed.

Embodiments of such a system may include one or more of the following: The processor-readable instructions, which, when executed by the processor, may be configured to cause the processor to cause the graph to be presented that illustrates the plurality of datasets is performed using a touchscreen interface configured to receive touch input in a region displaying the graph. The user input of the point on the graph may be received from a user via the touchscreen interface. The processor-readable instructions, which, when executed by the processor, may be further configured to cause the processor to deemphasize display of each dataset of the plurality of datasets besides the dataset after identifying, along the line parallel to the axis of the graph, the dataset from the plurality of datasets. The touchscreen interface may be a cellular phone.

DETAILED DESCRIPTION

In order to simplify display of values associated with data points of datasets graphically represented on a graph, only values of a particular data point of a particular dataset may be displayed at a given time. Display of one or more values of a data point may be displayed in the form of a tooltip. A tooltip may be a graphical item that provides detail about another entity. For example, a tooltip may be used to display one or more values of a data point of a dataset graphically represented on a graph.

When viewing a graph, a user may desire to view one or more values of a data point of a particular dataset. Selection of a particular data point, and/or, more generally, selection of a particular dataset may be difficult on touchscreen devices. This issue may be exacerbated if the touchscreen device is small, such as a smart phone. The imprecision of touching a finger to a touchscreen to select a graphical representation of a particular dataset present on a graph may be difficult, especially if the graphical representation of the dataset is proximate to one or more other graphical representations of other datasets. In such a scenario, a user may inadvertently select the incorrect dataset, potentially causing user frustration.

Rather than requiring a user to precisely select the dataset that the user desires to interact with, a user may select a point on the graph. From this point, the closest dataset may be determined. When a user selects a point on the graph, the closest graphical representation of a dataset along a line, such as a line parallel to the y-axis, may be identified. One or more values of the data point corresponding to the interaction of the line and the graphical representation of the selected dataset may be presented to the user. As such, a user may touch above or below a graphical representation of a dataset that the user desires to interact with. The user's touch location may be used to: 1) select the dataset; and 2) determine the data point of the dataset to have its values displayed.

Values of other data points of the dataset and/or data points of other datasets that are displayed on the graph may not be presented to the user at the same time. As such, only values of the selected data point may be presented to the user at one time. Presentation of the values may occur via a tooltip.

As an example of an embodiment involving a cellular phone, the graph may be displayed using the cellular phone's touchscreen. It may be difficult for the user to precisely select with his or her fingertip the dataset and/or data point that the user desires to be interrogated. As such, by determining which graphical representation of a dataset is closest to the point on the graph touched by the user, easier selection of a particular dataset and/or data point may be permitted. A touch of the user on the displayed graph may be detected. Along a vertical line (parallel to the y-axis) or along a horizontal line (parallel to the x-axis), the nearest graphical representation of a dataset may be determined. One or more values (e.g., the x-axis coordinate and the y-axis coordinate) associated with the data point at the intersection of the line and the graphical representation of the dataset may be displayed. In some embodiments, the nearest data point of the dataset to the intersection may be displayed. Once a particular data point is selected by the user, other datasets displayed on the graph may be faded, hidden, or otherwise deemphasized. To select the next data point of the already-selected dataset (in either direction), a swipe gesture may be performed on the touchscreen. For example, a swipe to the left (the user's finger touches the touchscreen then moves left along the surface of the touchscreen) may select the next data point to the left and cause its values to be displayed. A vertical swipe may be used to select the next dataset closest in the vertical direction swiped by the user along the line. Values of a data point of the now-selected dataset may be displayed.

Figure 1:
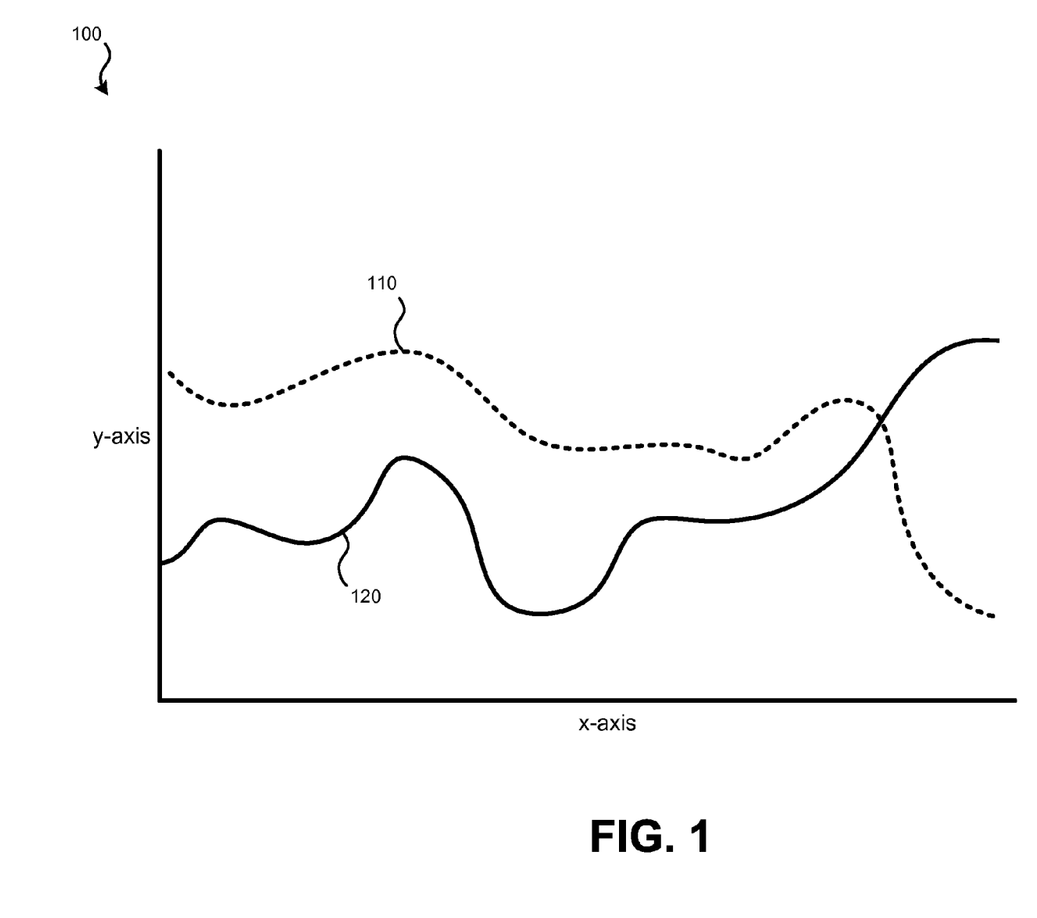
FIG. 1 illustrates an embodiment of a graph that contains graphical representations of multiple datasets.

FIG. 1 illustrates an embodiment of graph 100 that contains graphical representations of multiple datasets. Graph 100 contains graphical representations of two datasets, dataset 110 and dataset 120. Each of these datasets is graphically represented by lines that pass through data points of the datasets. It should be understood that in other embodiments a greater number of datasets may be present and represented. It should be understood that a reference to a "dataset" within this document can refer to either the collection of data points that makes up the dataset or the graphical representation of the dataset on a graph. Graph 100 is two-dimensional, therefore it has an x-axis and a y-axis.

Graph 100 may be displayed using a touchscreen. As such, to provide input to graph 100, a user may touch a point on graph 100. A mobile device, such as a cellular phone, may be used to present graph 100. Embodiments of graph 100 are used throughout this document. Graph 100 is for example purposes only; other graphs may be formatted differently, have different numbers and/or names for axes, and/or have other differing properties.

Figure 2:
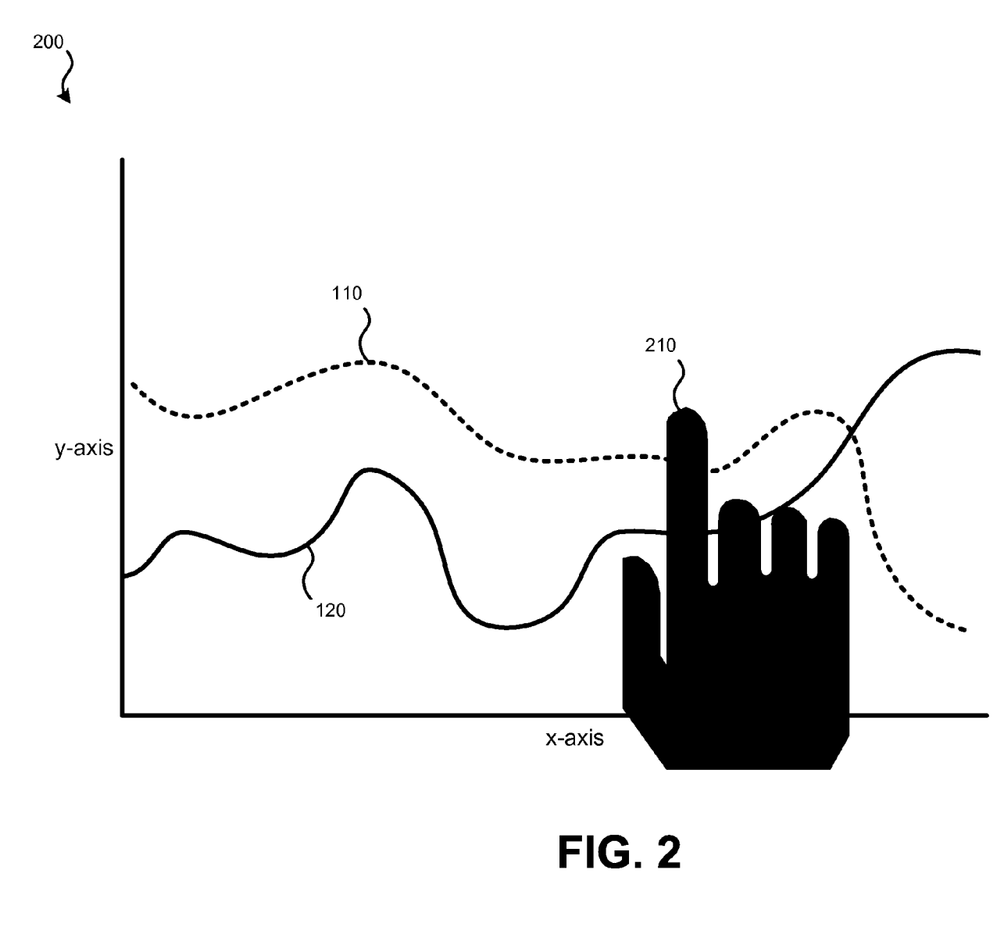
FIG. 2 illustrates an embodiment of a graph that contains graphical representations of multiple datasets being touched by a user.

FIG. 2 illustrates an embodiment 200 of a graph that contains graphical representations of multiple datasets being touched by a user. In this embodiment, a user's hand 210 (e.g., fingertip) is touching a point on the touchscreen device displaying the graph. The graph of embodiment 200 may represent graph 100 of FIG. 1. The point on the touchscreen touched by user's hand 210 may be selected as a user input point to determine a dataset that is desired to be selected by the user and/or a value of a data point to be presented to the user, such as via a tool tip. As such, a point on the graph is determined using the user's touch of the touchscreen. While the graph of FIG. 2 is shown large relative to the user's hand 210, it should be understood that if the graph of FIG. 2 is displayed by a mobile device such as a cellular phone, the display of the graph may be smaller in relation to the user's hand 210 (thus possibly making it more difficult for the user to precisely touch a particular dataset on the graph). While various embodiments described herein may be directed to touchscreen interfaces, it should be understood that such embodiments may be applied to other forms of user interfaces, such as a cursor controlled by a touchpad, mouse, or trackball input device. Other forms of input devices are also possible.

Figure 3:
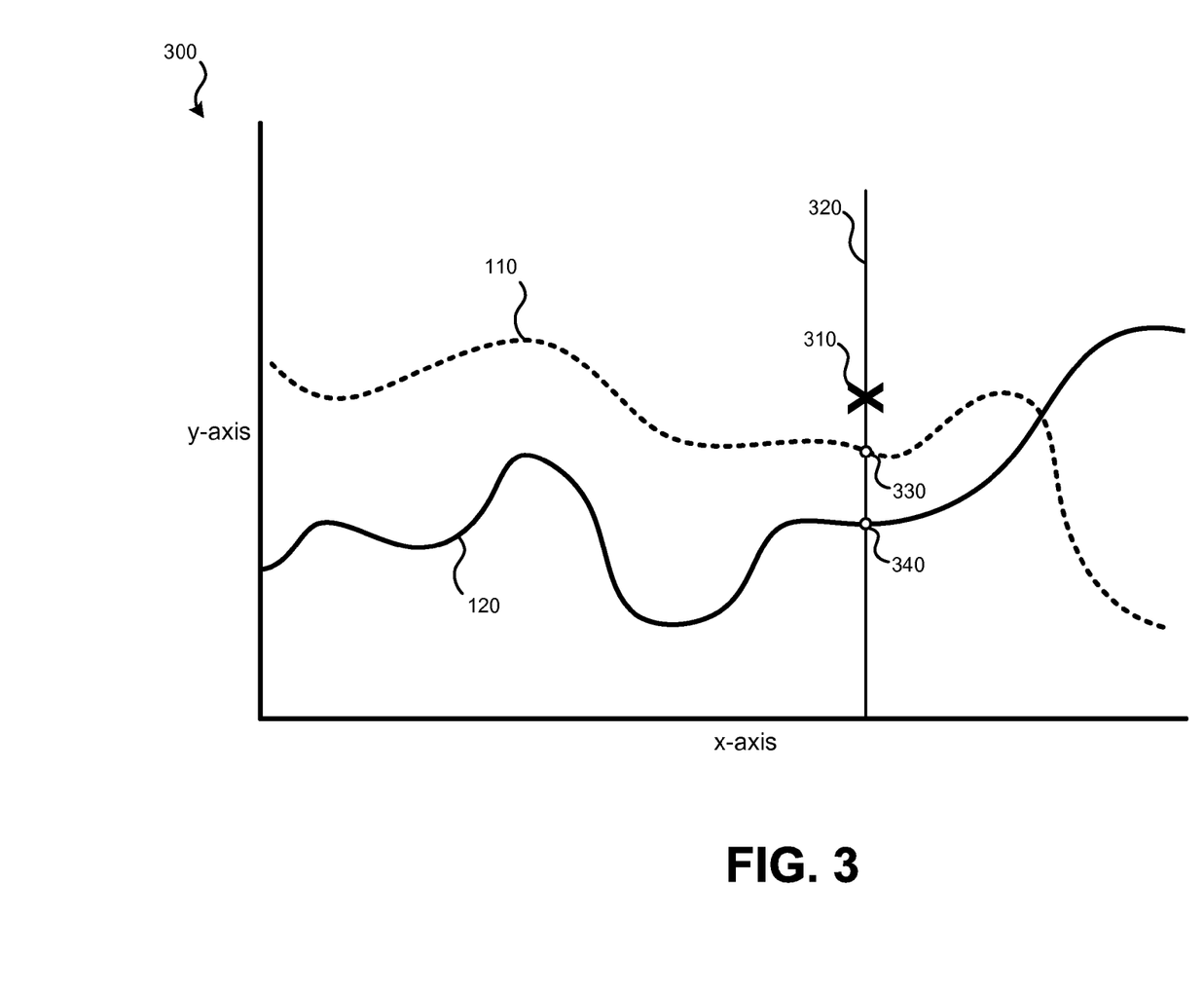
FIG. 3 illustrates an embodiment of a graph following a user selecting a point on the graph.

FIG. 3 illustrates an embodiment 300 of a graph following a user selecting a point on the graph. Graph 300 may represent graph 100 and graph 200 following input of a point on the graph being received from a user, as illustrated in FIG. 2. Position 310 indicates the location on graph 300 touched by user's hand 210 in FIG. 2. As such, the location on the touchscreen touched by user's hand 210 in FIG. 2 corresponds to position 310 of FIG. 3. A visual indication, such as the "x" illustrated in FIG. 3, may or may not be displayed by the touchscreen device to indicate where the user input was determined to be located.

The closest dataset and/or data point of the dataset to position 310 along line 320 may be determined. Line 320 may be a line parallel to the y-axis that passes through position 310. While the embodiment of FIG. 3 illustrates the use of a line parallel to the y-axis that passes through position 310, it should be understood that in other embodiments, a line parallel to the x-axis may be used (or some other axis). A user may be permitted to select the orientation of line 320. In some embodiments, the orientation of line 320 may be determined based on characteristics of the graph being displayed.

As illustrated in embodiment 300, the graphical representation of dataset 110 is closer to position 310 along line 320 than the graphical representation of dataset 120. Each of these datasets may have a data point that is located at the intersection of line 320 and the graphical representation of the datasets: data point 330 is at the intersection of line 320 and the graphical representation of dataset 110, data point 340 is at the intersection of line 320 and the graphical representation of dataset 120. Since data point 330 is closer to position 310 along line 320, it may be determined that dataset 110 was intended to be selected by the user. In some embodiments, the values of data point 330 and data point 340 may be interpolated or extrapolated based on data points within the respective datasets. In some embodiments, graphical representations of dataset 120 and/or other datasets that were not selected, may be faded, hidden, or otherwise deemphasized from dataset 110 such that the graphical representation of dataset 110 is emphasized as the selected dataset. Line 320 may or may not be displayed to the user.

In some embodiments, a data point of a dataset may not exist where line 320 intersects with the graphical representation of a dataset. In such an instance, the nearest data point to the intersection may be selected from the selected dataset or a value for the intersection of the line with the graphical representation of the selected dataset may be interpolated (or extrapolated) based on other data points of the dataset. If the data point and/or dataset selected based on the user's touch input is no longer desired to have its values displayed, a gesture such as a swipe on the touchscreen may be used to select a different dataset and/or data point. For example, if data point 330 is selected, a vertical swipe downward on the touchscreen may result in dataset 120 (and data point 340) being selected. A swipe left may result in a data point to the left of data point 330 that is part of dataset 110 being selected. A swipe right may result in a data point to the right of data point 330 that is part of dataset 110 being selected.

Figure 4:
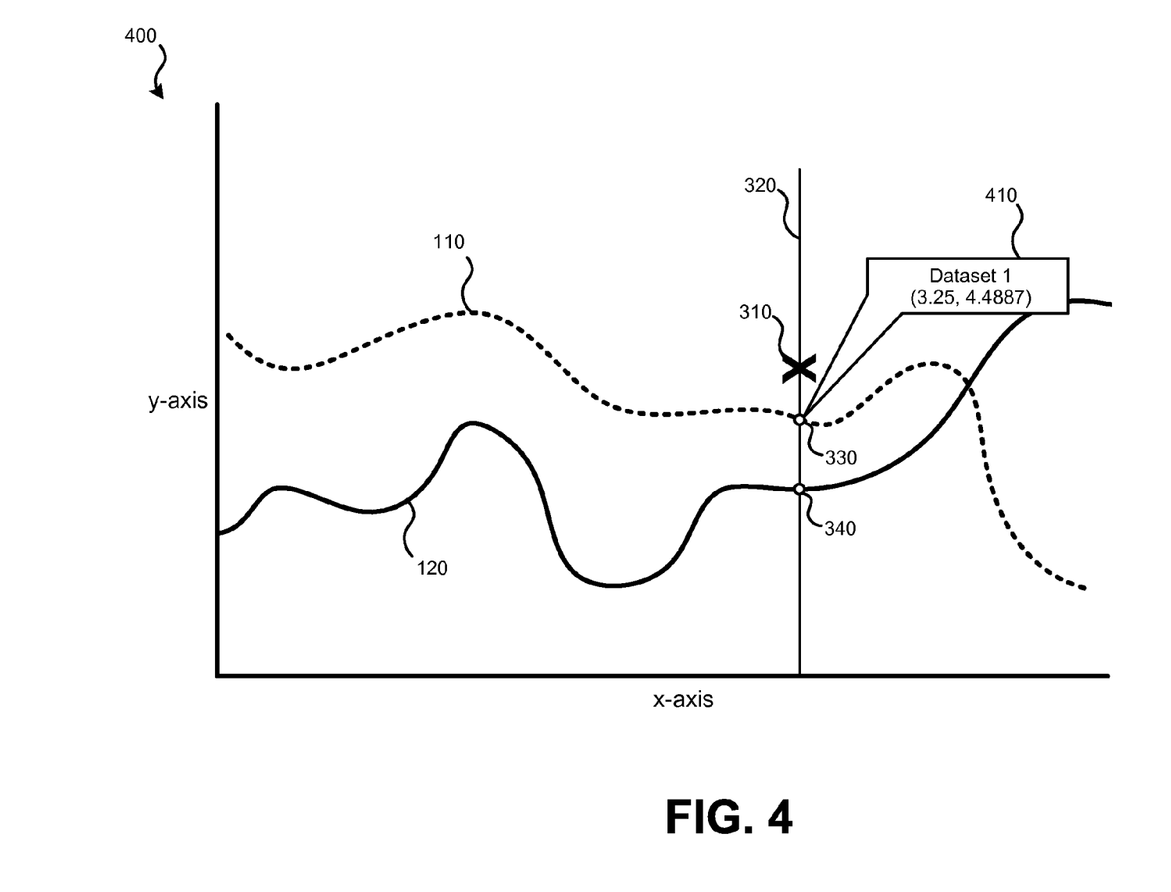
FIG. 4 illustrates an embodiment of a graph with values of a data point displayed.

One or more values associated with a data point of a selected dataset may be displayed. FIG. 4 illustrates an embodiment 400 of a graph, which may represent the graphs of FIGS. 1 through 3, with values of data point 330 presented. Data point 330 may represent the intersection of line 320 and the graphical representation of dataset 110. As such, data point 330 may be either a data point of the dataset used to create graphical representation of dataset 110 or interpolated based on data points of dataset 110.

Tooltip 410 identifies the values of data point 330. In the graph of embodiment 400, tooltip 410 indicates the name of dataset 110, the x-axis value of data point 330, and the y-axis value of data point 330. In other embodiments, a display format other than a tooltip may be used to present one or more values of data point 330. The values of other data points of dataset 110 and/or other datasets that are not selected (such as dataset 120) may not be displayed. In FIG. 4, two values of data point 330 are illustrated (the x-value and y-value); in other embodiments, one or more than two values may be displayed.

If a user desires to select a different data point within the already selected dataset, a gesture may be performed using the touchscreen. For example, a swipe of the user's finger to the left or to the right on the touchscreen displaying the graph may select the next data point of the dataset represented by the graphical representation of dataset 110 to the left or to the right, respectively. While FIGS. 1-4 illustrate a user providing input that results in the selection of a data point of dataset 110, this is for example purposes only; a user may select a point on a graph that results in another dataset being selected.

Figure 5:
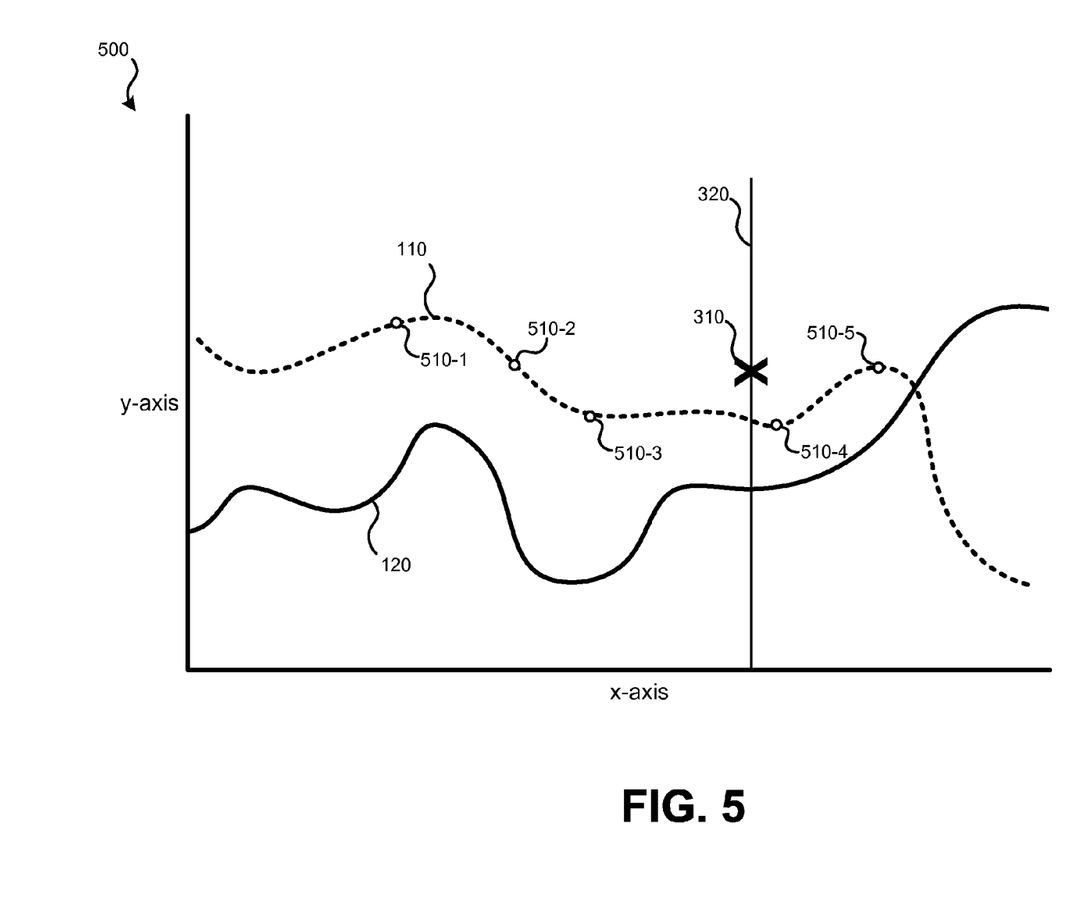
FIG. 5 illustrates another embodiment of a graph following a user selecting a point on the graph.

FIG. 5 illustrates an embodiment 500 of a graph following a user selecting a point on the graph. In embodiment 500, the graphical representation of the dataset closest to position 310 (where the user touched) is selected and the closest data point to the intersection of the graphical representation of the dataset and line 320 is selected for display. Position 310 indicates the location on graph 300 touched by user's hand 210 in FIG. 2. As such, the location on the touchscreen touched by user's hand 210 in FIG. 2 corresponds to position 310 of FIG. 3. A visual indication, such as the "x" illustrated in FIG. 5, may or may not be displayed by the touchscreen device to indicate where the user input was determined to be located.

The closest dataset to position 310 along line 320 may be determined. Line 320 may be a line parallel to the y-axis that passes through position 310. While the embodiment of FIG. 5 illustrates the use of a line parallel to the y-axis that passes through position 310, it should be understood that in other embodiments a line parallel to the x-axis may be used. A user may be permitted to select the orientation of line 320. In some embodiments, the orientation of line 320 may be determined based on characteristics of the graph being displayed.

As illustrated in embodiment 300, (the graphical representation of) dataset 110 is closer to position 310 along line 320 than (the graphical representation of) dataset 120. Since data point 510-4 is closer to the intersection of line 320 and the graphical representation of dataset 110 than other data points of dataset 110, one or more values of data point 510-4 may be displayed. In some embodiments, the graphical representation of dataset 120 and/or other datasets and/or data points that were not selected may be faded, hidden, or otherwise deemphasized from dataset 110 such that dataset 110 is emphasized as the selected dataset. Line 320 may or may not be displayed to the user.

In some embodiments, a data point of a dataset may not exist where line 320 intersects with the graphical representation of a dataset (without performing interpolation or extrapolation). In such an instance, the nearest data point to the intersection may be selected from the selected dataset or a value for the intersection of the line with the graphical representation of the selected dataset may be interpolated (or extrapolated) based on other points of the dataset. If the data point and/or dataset selected based on the user's touch input is no longer desired, a gesture such as a swipe on the touchscreen may be used to select a different dataset and/or data point. For example, if data point 330 is selected, a vertical swipe downward on the touchscreen may result in the graphical representation of dataset 120 (and data point 340) being selected. A swipe left may result in a data point to the left of data point 330 that is part of dataset 110 being selected. A swipe right may result in a data point to the right of data point 330 that is part of dataset 110 being selected.

Figure 6:
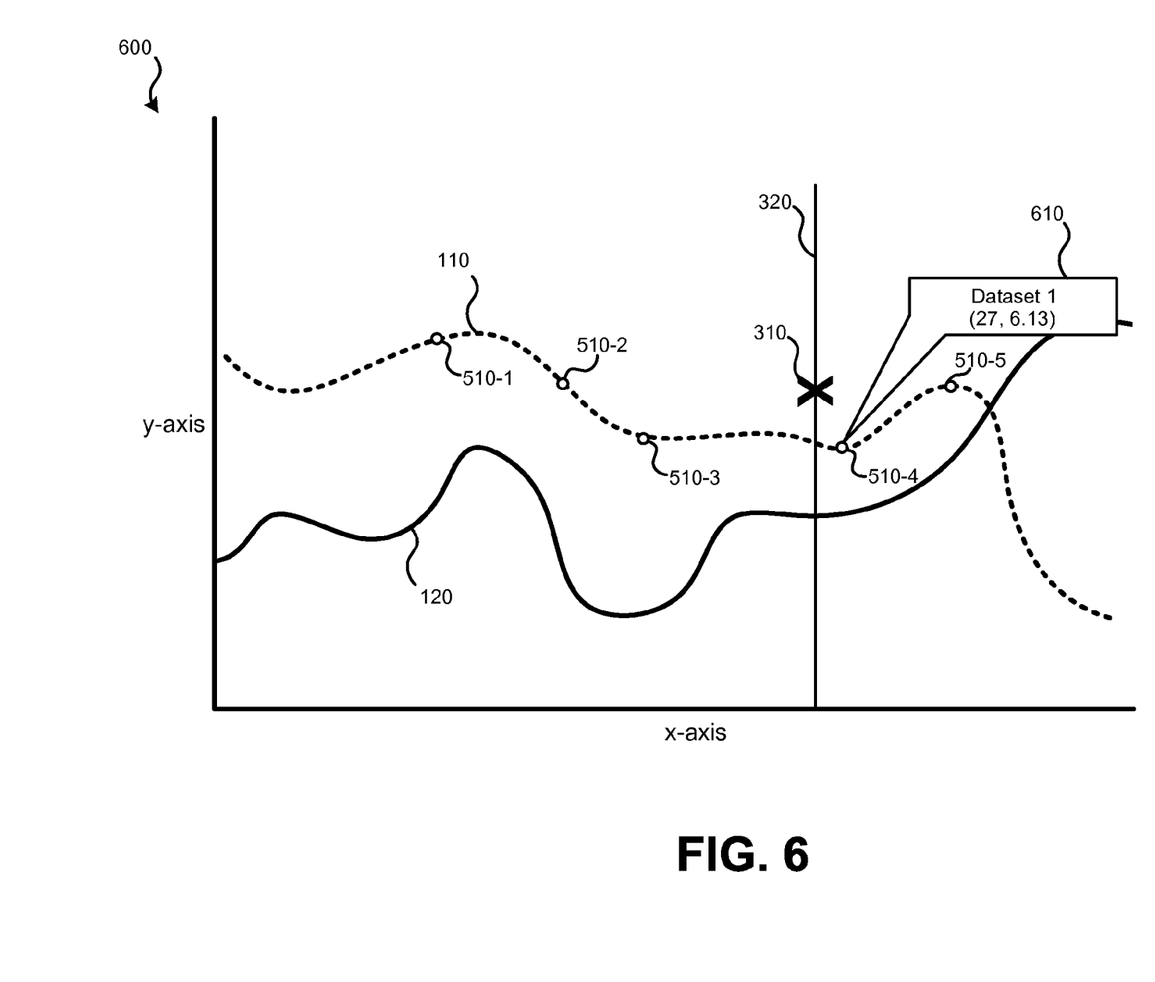
FIG. 6 illustrates another embodiment of a graph with values of a data point displayed.

Values of data point 510-4 are presented in embodiment 600 of FIG. 6. FIG. 6 illustrates an embodiment 600 of the graph of FIG. 5. Data point 510-4 may represent the closest data point of the dataset represented by the graphical representation of dataset 110 to the intersection of line 320 and the graphical representation of dataset 110. In some embodiments, data point 510-4 is selected because it is the closest data point of the dataset represented by the graphical representation of dataset 110 to position 310. As such, data point 510-4 is a data point of the dataset that is not interpolated or extrapolated.

Tooltip 610 identifies the values of data point 510-4. In the graph of embodiment 600, tooltip 610 indicates the name of the dataset associated with the graphical representation of dataset 110, the x-axis value of data point 510-4, and the y-axis value of data point 510-4. In other embodiments, a display format other than a tooltip may be used to present one or more values of data point 510-4. The values of other data points of the dataset represented by the graphical representation of dataset 110 and/or other datasets that are not selected (such as dataset 120), may not be displayed. In FIG. 6, two values of data point 510-4 are illustrated (the x-value and y-value); in other embodiments, one or more than two values may be displayed.

If a user desires to select a different data point within the already selected dataset, a gesture may be performed using the touchscreen. For example, a swipe of the user's finger to the left or to the right on the touchscreen displaying the graph may select the next data point of the dataset represented by the graphical representation of dataset 110 to the left or to the right, respectively. While FIG. 6 illustrates a user providing input that results in the selection of a data point of dataset 110, this is for example purposes only; a user may select a point on a graph that results in another dataset being selected.

Figure 7:
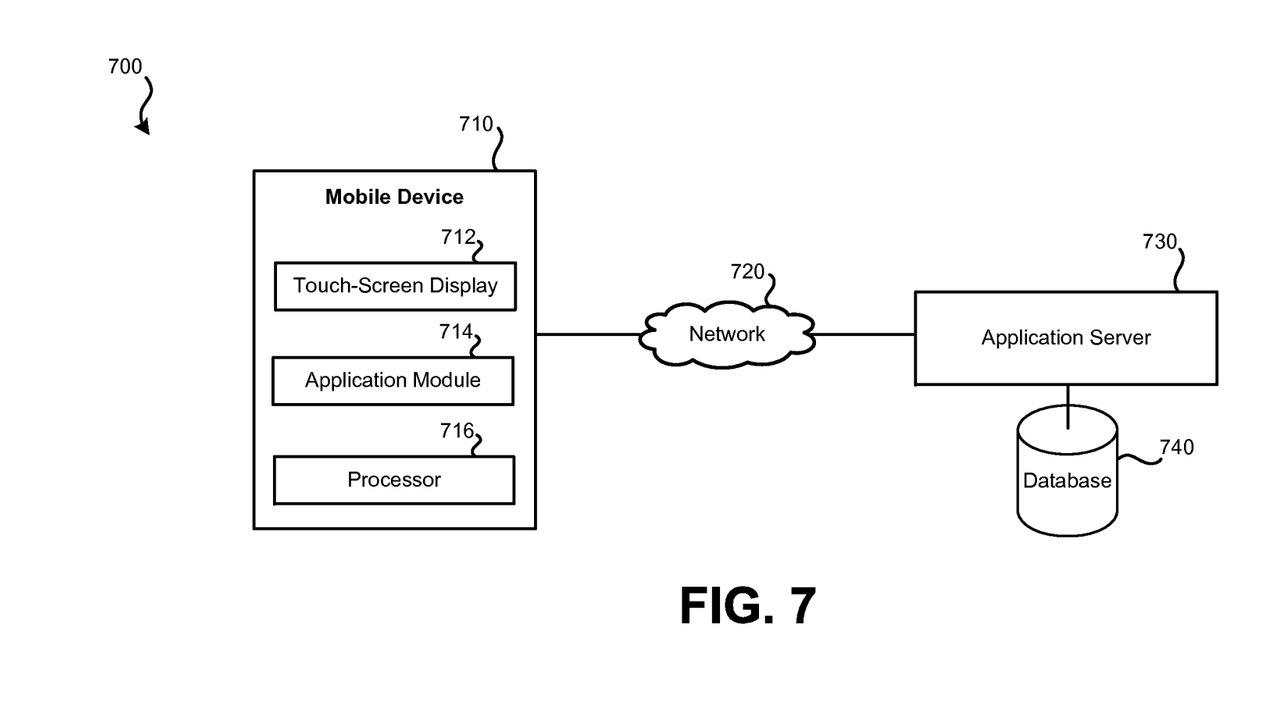
FIG. 7 illustrates an embodiment of a system for displaying a value of a data point on a graph.

FIG. 7 illustrates an embodiment of a system 700 for displaying a value of a data point on a graph. System 700 may be used to display the graphs of FIGS. 1-6. System 700 may include: mobile device 710, network 720, application server 730, and database 740. More or fewer components may be present in other embodiments of system 700.

Mobile device 710 may represent a cellular phone (e.g., a smart phone), tablet computer, laptop, or some other form of computerized device. Mobile device 710 may include a touchscreen display 712. Touchscreen display 712 may be used to display graphs, such as the graphs of FIGS. 1-6 and to receive user input in the form of touch input and/or touch-based gestures. Application module 714 may include one or more non-transitory computer-readable mediums and may store one or more applications configured to contain instructions that cause the mobile device to present graphs and receive user input related to the graphs. Application module 714 may contain a locally stored application. Application module 714 may require interaction with a remote application server 730 to function.

Processor 716 may be a general-purpose or a specialized processor that enables presentation of graphs and user input to be received on such graphs. Datasets that are used to create the graphs may be stored locally or remotely from mobile device 710.

Mobile device 710 may communicate using network 720. Network 720 may represent one or more public and/or private networks. Network 720 may include a wireless, cellular network, the Internet, and/or a corporate intranet.

Application server 730 may exchange data with mobile device 710 via network 720 to enable display of graphs and values of data points. Application server 730 may at least partially process data to create the graphs displayed by mobile device 710. The datasets used to create the graphs may be stored by mobile device 710 or may be stored by or accessible to application server 730. For example, database 740 may store datasets that are available for graphing. Database 740 may be local or remote to application server 730. As such, a user, via mobile device 710, may request a graph of specific datasets. These datasets may be retrieved from database 740. Application server 730 and/or mobile device 710 may then process the datasets such that the user is presented with a graph on mobile device 710. Interaction with the graphs may then occur as described in FIGS. 1-6.

Figure 8:
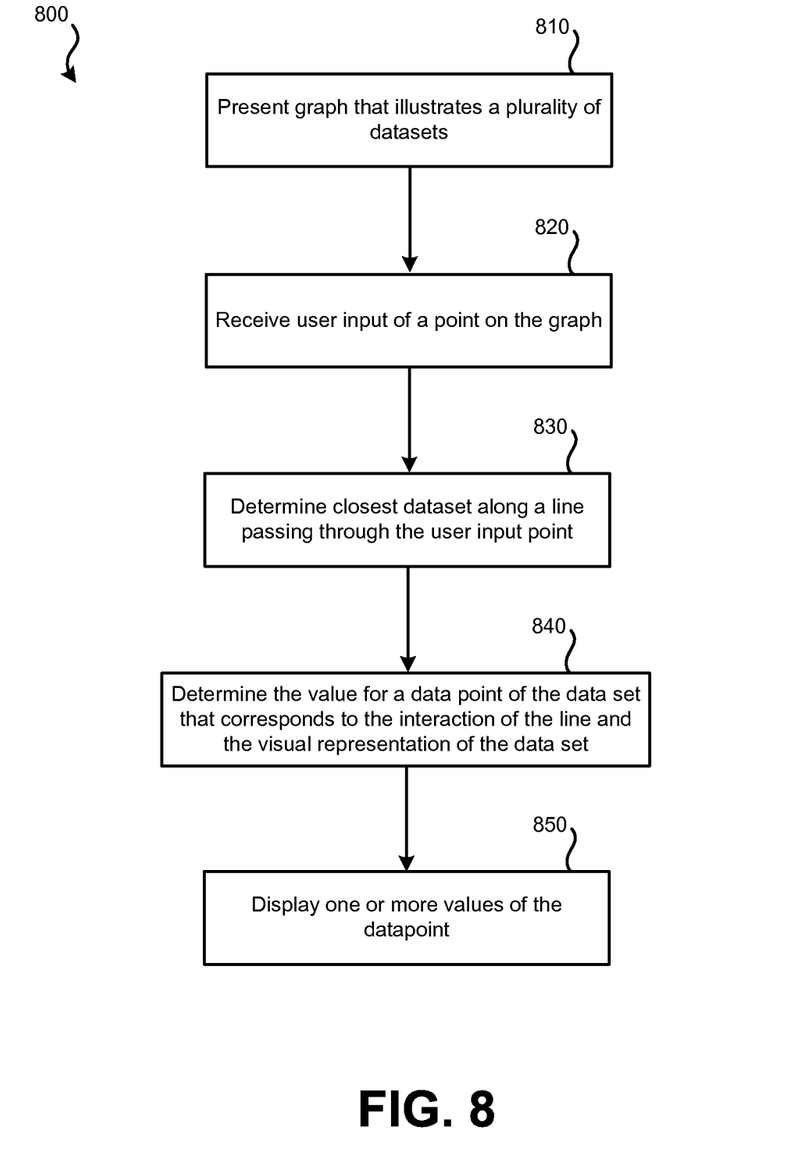
FIG. 8 illustrates an embodiment of a method for displaying a value of a data point on a graph.

FIG. 8 illustrates an embodiment of a method 800 for displaying a value of a data point on a graph. Method 800 may be performed using a computer system, such as computer system 1000 of FIG. 10, which may be incorporated as at least part of a computerized device such as a cellular phone. A mobile device, which may have a touchscreen interface, may be used to perform method 800. Method 800 may be performed using system 700 of FIG. 7 or some other system configured to enable display of a value of a data point on a graph. Means for performing method 800 include mobile computerized devices, non-mobile computerized devices, wireless networks, application servers, and databases.

At step 810, a graph may be presented that displays multiple datasets, each of which dataset contains multiple data points. Each dataset may be represented by a line. The graph may be presented using a touchscreen device, such that a user can touch various points on the graph. The touchscreen device may be a cellular phone. As such, the touchscreen of the mobile device may be small and it may be difficult for a user to precisely select a particular dataset and/or data point of a dataset via touch. Step 810 may involve a user selecting particular datasets to be graphed and a graph being presented at least partially based on the selected datasets.

At step 820, an input may be received from a user of a point on the graph. This point may be selected by the user touching a point on the graph displayed via a touchscreen device. The user may touch the screen at a particular point and then remove his or her finger from the screen. Other forms of input are also possible, such as a user using a cursor to select a point on the graph.

At step 830, the closest dataset (which may refer to the closest graphical representation of a dataset) to the point received as input at step 820 along a line parallel to the y-axis may be determined. Whether the line is parallel to the x-axis or the y-axis may be preconfigured or selected by the user. Other line orientations are also possible. If the selected dataset is not the dataset desired by the user, a gesture, such as a vertical swipe, may be used to select the next closest graphical representation of a dataset to the input received at step 820.

At step 840, a data point of the dataset identified at step 830 that corresponds to an intersection of the line and the closest dataset may be determined. This data point may be at the intersection of the line and the graphical representation of the dataset that was determined closest at step 830. This may mean that one or more values of the data point of step 840 are interpolated or extrapolated based on other data points of the dataset. In some embodiments, rather than interpolating or extrapolating a data point at the intersection, the closest data point of the dataset to the intersection of the line and the graphical representation of the dataset is selected. One or more values of this data point may be retrieved. The values may be retrieved locally or remotely, such as from a remote database.

At step 850, one or more values of the data point identified at step 840 may be displayed to the user, such as via a tooltip. An indication of the selected dataset may also be presented, such as via text or an indication in a legend of the graph. When the one or more values of this data point are displayed, values of other data points of the same dataset and/or other datasets may not be displayed. As such, following the input of a point on the graph, only one or more values (e.g., an x-axis value and/or a y-axis value) of a single data point may be presented to the user.

Figure 9:
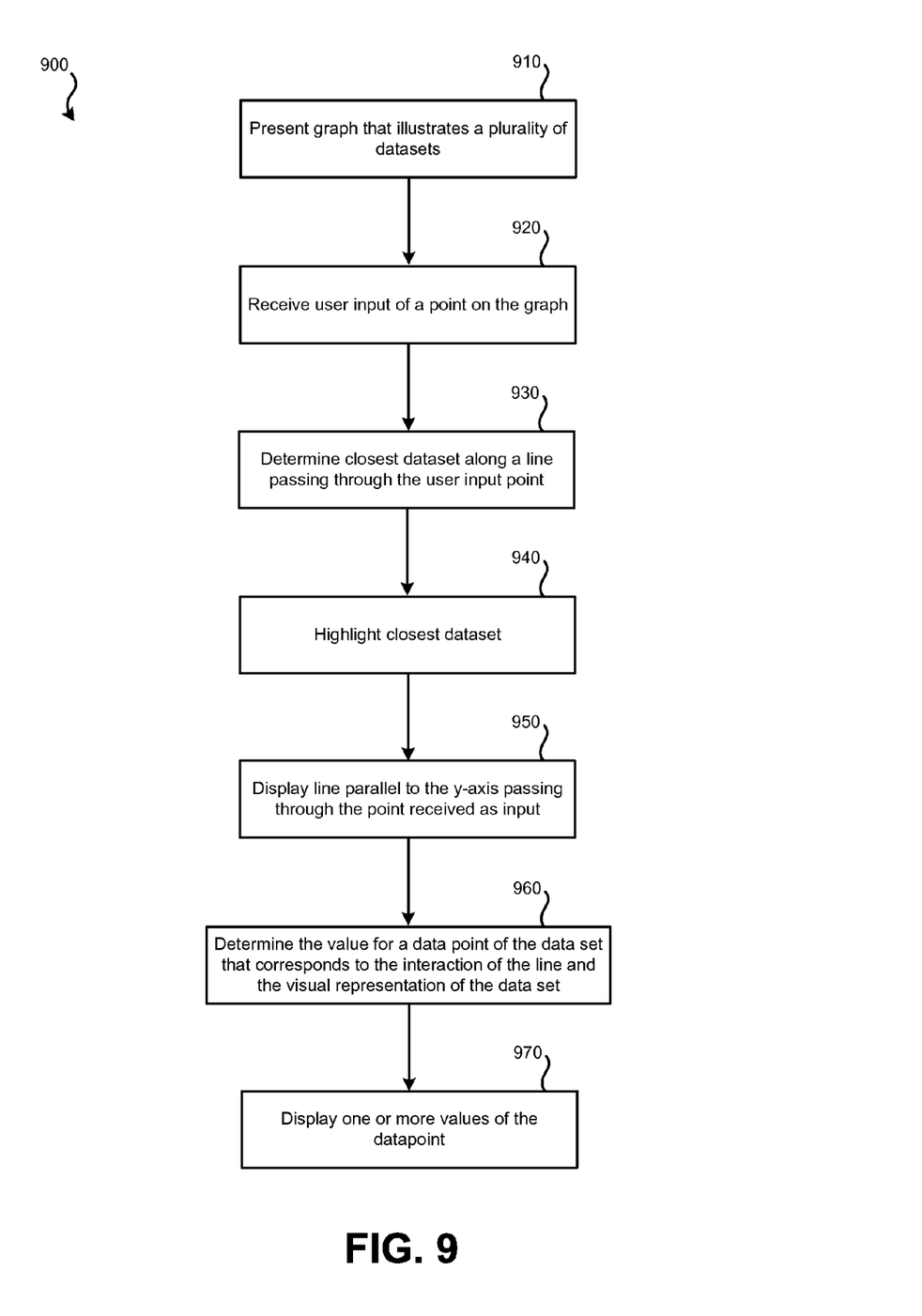
FIG. 9 illustrates another embodiment of a method for displaying a value of a data point on a graph.

FIG. 9 illustrates another embodiment of a method 900 for displaying a value of a data point on a graph. Method 900 may be performed using a computer system, such as computer system 1000 of FIG. 10, which may be incorporated into a computerized device such as a mobile device (e.g., cellular phone). A mobile device, which may have a touchscreen interface, may be used to perform method 900. Method 900 may be performed using system 700 of FIG. 7 or some other system configured to enable display of a value of a data point on a graph. Means for performing method 900 include computerized devices, wireless networks, application servers, and databases. Method 900 may represent a more detailed embodiment of method 800.

At step 910, a graph may be presented that displays graphical representations of multiple datasets. Each of these datasets may contain multiple data points. Each dataset may be represented by a line (which may be curved, such as the graphical representation of dataset 110 of FIG. 1). The graph may be presented using a touchscreen device, such that a user can touch various points on the graph. As such, the touchscreen of the mobile device may be small (in relation to the user's hand), and it may be difficult for a user to precisely select a particular dataset and/or data point of a dataset via touch. Step 910 may involve a user selecting particular datasets to be graphed and a graph being presented based on the selected datasets.

At step 920, an input may be received from a user of a point on the graph. This point may be selected by the user touching a point of the graph displayed via the touchscreen device. The user may touch the screen at a particular point and then remove his or her finger from the screen. Other forms of input are also possible, such as a user using a cursor to select a point on the graph. The user may also drag his finger to the desired position and then release his finger from the touchscreen.

At step 930, the closest dataset graphical representation of a dataset to the point received as input at step 920 along a line parallel to an axis (e.g., y-axis, x-axis, or some other axis) may be determined. Whether the line is parallel to the x-axis, y-axis, or some other axis may be preconfigured or selected by the user. If the dataset determined at step 930 is not the dataset desired by the user, a gesture, such as a vertical swipe, may be used to select the next closest graphical representation of a dataset to the input received at step 820.

At step 940, the dataset determined to be selected at step 930 may be highlighted. Such highlighting may be accomplished by deemphasizing other datasets, such as by fading their graphical representations or removing them from the graph. In some embodiments, such datasets will remain listed in a legend of the graph. In some embodiments, highlighting may include bolding or otherwise emphasizing the graphical representation of the selected dataset.

At step 950, the line that is parallel to the preconfigured or selected axis that passes through the point received as input from the user may be displayed. If a user desires to select the next data point within the same dataset, a gesture, such as a swipe (to the left or to the right), may be performed. As such, the user may be able to view an intersection of the line and the graphical representation of the selected dataset.

At step 960, values of a data point of the dataset identified at step 930 that correspond to the intersection may be determined. This data point may be at the intersection of the line and the graphical representation of the dataset that was determined closest at step 930. This may mean that the values of the data point of step 960 are determined via interpolation or extrapolation based on data points of the data set. In some embodiments, rather than interpolating or extrapolating a data point at the intersection, the closest data point of the dataset to the intersection of the line and the graphical representation of the dataset is retrieved. One or more values of this data point may be retrieved. The values may be retrieved locally or remotely, such as from a remote database.

At step 970, one or more values of the data point retrieved at step 960 may be displayed to the user, such as via a tooltip. An indication of the selected dataset may also be presented, such as via text or an indication in a legend of the graph. When the one or more values of this data point are displayed, values of other data points of the same dataset and/or other datasets may not be displayed. As such, following the input of a point on the graph, only one or more values (e.g., an x-axis value and/or a y-axis value) of a single data point may be presented to the user. Other data points of the same dataset may be selected via gestures, such as a swipe to the left or right on the touchscreen device. Alternate datasets may be selected, thus resulting in other data points being selected, via vertical swipes (e.g., a swipe up may result in the dataset graphical illustrated on the graph above the currently selected dataset being selected).

Figure 10:
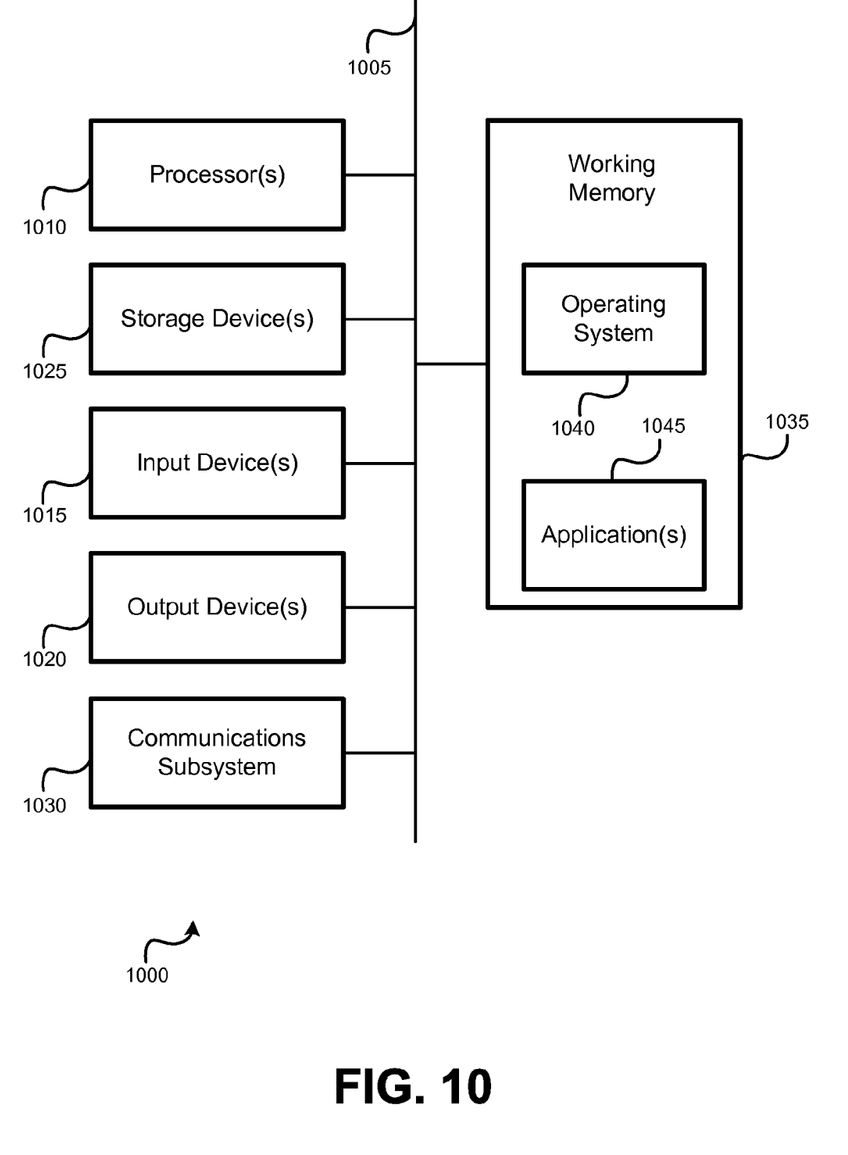
FIG. 10 illustrates an embodiment of a computer system.

A computer system as illustrated in FIG. 10 may be incorporated as part of the previously described computerized devices, such as a mobile device or computer system presenting the graphs of FIGS. 1-6. For example, computer system 1000 can represent some of the components of the mobile devices and/or the computer systems discussed in this application. FIG. 10 provides a schematic illustration of one embodiment of a computer system 1000 that can perform the methods provided by various embodiments, as described herein in relation to FIGS. 8 and 9. Computer system 1000 may represent the mobile device and/or application server of system 700 of FIG. 7. Computer system 1000 may include a touchscreen interface. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A computer-implemented method for displaying a value of a data point on a graph, comprising:
    displaying, by a touchscreen computerized device, the graph that illustrates a plurality of datasets, wherein:
        each of the plurality of datasets is visually represented on the graph;
    receiving a single user input of a point on the graph by a user touching one location on the touchscreen computerized device, wherein the user does not select a particular dataset from the plurality of datasets;
    identifying, by the touchscreen computerized device, along a line parallel to an axis of the graph, a single closest dataset from the plurality of datasets, the single closest dataset corresponding to a graphical representation closest to the point along the line parallel to the axis of the graph as compared to graphical representations that correspond to other datasets of the plurality of datasets, wherein:
        the line passes through the point on the graph indicated by the user input;
    retrieving, by the touchscreen computerized device, the value for the data point of the dataset that corresponds to an intersection of the line parallel to a y-axis and the graphical representation of the dataset;
    displaying, by the touchscreen computerized device, the value for the data point corresponding to the single closest dataset identified as closest to the point along the line parallel to the axis of the graph;
    displaying, by the touchscreen computerized device, a visual indication of the point on the graph indicated by the user input;
    detecting, by the touchscreen computerized device, a swipe gesture performed by the user on the touchscreen computerized device; and
    in response to detecting the swipe gesture, displaying, by the touchscreen computerized device, a second value for a second data point wherein the second data point is selected based on a direction of the swipe gesture and is a closest data point to the data point based on the direction of the swipe gesture, wherein the value for the data point is not presented when the second value for the second data point is presented,
    wherein retrieving the value for the data point of the dataset that corresponds to the intersection of the line parallel to the axis of the graph and the graphical representation of the dataset comprises:
    identifying the data point of the dataset closest to the intersection.

2. The computer-implemented method for displaying the value of the data point on the graph of claim 1, further comprising:

deemphasizing display of each dataset of the plurality of datasets besides the dataset after identifying, along the line parallel to the axis of the graph, the dataset from the plurality of datasets.

3. The computer-implemented method for displaying the value of the data point on the graph of claim 1, further comprising:
displaying the line parallel to the axis of the graph.

4. The computer-implemented method for displaying the value of the data point on the graph of claim 1, wherein displaying the value for the data point comprises not displaying values for any other data point while the value is displayed.

5. The computer-implemented method for displaying the value of the data point on the graph of claim 1, wherein retrieving the value for the data point of the dataset that corresponds to the intersection of the line parallel to the axis and the graphical representation of the dataset comprises:
determining a value for the intersection.

6. The computer-implemented method for displaying the value of the data point on the graph of claim 1, wherein the touchscreen computerized device is a cellular phone.

7. The computer-implemented method for displaying the value of the data point on the graph of claim 1, wherein the second data point is in a dataset from the plurality of datasets that is different from the single closest dataset.

8. A non-transitory processor-readable medium for displaying a value of a data point on a graph, the non-transitory processor-readable medium comprising processor-readable instructions configured to cause a processor to:
cause the graph to be presented by a touchscreen interface that illustrates a plurality of datasets, wherein:
each of the plurality of datasets is visually represented on the graph;
receive a single user input of a point on the graph by a user touching one location on the touchscreen interface, wherein the user does not select a particular dataset from the plurality of datasets;
identify, along a line parallel to an axis of the graph, a single closest dataset from the plurality of datasets, the single closest dataset corresponding to a graphical representation closest to the point along the line parallel to the axis of the graph as compared to graphical representations that correspond to other datasets of the plurality of datasets, wherein:
the line passes through the point on the graph indicated by the user input;
retrieve the value for the data point of the dataset that corresponds to an intersection of the line parallel to a y-axis and the graphical representation of the dataset;
cause the value for the data point to be displayed corresponding to the single closest dataset identified as closest to the point along the line parallel to the axis of the graph;
cause a visual indication to be displayed to indicate the point on the graph indicated by the user input;
detect, on the touchscreen interface, a swipe gesture performed by the user; and
in response to detecting the swipe gesture, cause the touchscreen interface to present a second value for a second data point wherein the second data point is selected based on a direction of the swipe gesture and is a closest data point based on the direction of the swipe gesture, wherein the value for the data point is not presented when the second value for the second data point is presented,
wherein the processor-readable instructions configured to cause the processor to retrieve the value for the data point of the dataset that corresponds to the intersection of the line parallel to the axis of the graph and the graphical representation of the dataset comprises processor-readable instructions configured to cause the processor to:
identify the data point of the dataset closest to the intersection.

9. The non-transitory processor-readable medium for displaying the value of the data point on the graph of claim 8, wherein the processor-readable instructions are further configured to cause the processor to:
deemphasize display of each dataset of the plurality of datasets besides the dataset after identifying, along the line parallel to the axis of the graph, the dataset from the plurality of datasets.

10. The non-transitory processor-readable medium for displaying the value of the data point on the graph of claim 8, wherein the processor-readable instructions are further configured to cause the processor to:
cause the line parallel to the axis of the graph to be displayed.

11. The non-transitory processor-readable medium for displaying the value of the data point on the graph of claim 8, wherein displaying the value for the data point comprises not displaying values for any other data point while the value is displayed.

12. The non-transitory processor-readable medium for displaying the value of the data point on the graph of claim 8, wherein the processor-readable instructions configured to cause the processor to retrieve the value for the data point of the dataset that corresponds to the intersection of the line parallel to the axis and the graphical representation of the dataset comprises processor-readable instructions configured to cause the processor to:
determine a value for the intersection.

13. The non-transitory processor-readable medium for displaying the value of the data point on the graph of claim 8, wherein the touchscreen interface is part of a cellular phone.

14. The non-transitory processor-readable medium for displaying a value of a data point on a graph of claim 8, wherein the second data point is in a dataset from the plurality of datasets that is different from the single closest dataset.

15. A system for displaying a value of a data point on a graph, the system comprising:
a touchscreen interface;
a processor; and
a memory communicatively coupled with and readable by the processor and having stored therein processor-readable instructions which, when executed by the processor, cause the processor to:
cause the graph to be presented by the touchscreen interface that illustrates a plurality of datasets, wherein:
each of the plurality of datasets is visually represented on the graph;
receive a single user input of a point on the graph by a user touching one location on the touchscreen interface, wherein the user does not select a particular dataset from the plurality of datasets;
identify, along a line parallel to an axis of the graph, a single closest dataset from the plurality of datasets, the single closest dataset corresponding to the graphical representation closest to the point along the line parallel to the axis of the graph as compared to graphical representations that correspond to other datasets of the plurality of datasets, wherein the line passes through the point on the graph indicated by the user input;

retrieve the value for the data point of the dataset that corresponds to an intersection of the line parallel to a y-axis and the graphical representation of the dataset;

cause the value for the data point to be displayed corresponding to the single closest dataset identified as closest to the point along the line parallel to the axis of the graph;

cause a visual indication to be displayed to indicate the point on the graph indicated by the user input where the user input was determined to be located;

detect, using the touchscreen interface, a swipe gesture performed by the user on the touchscreen interface; and in response to detecting the swipe gesture, cause the touchscreen interface to present a second value for a second data point wherein the second data point is selected based on a direction of the swipe gesture and is a closest data point based on the direction of the swipe gesture, wherein the value for the data point is not presented when the second value for the second data point is presented, wherein retrieving the value for the data point of the dataset that corresponds to the intersection of the line parallel to the axis of the graph and the graphical representation of the dataset comprises:

identifying the data point of the dataset closest to the intersection.

16. The system for displaying the value of the data point on the graph of claim 15, wherein the processor-readable instructions, which, when executed by the processor, are further configured to cause the processor to:

deemphasize display of each dataset of the plurality of datasets besides the dataset after identifying, along the line parallel to the axis of the graph, the dataset from the plurality of datasets.

17. The system for displaying the value of the data point on the graph of claim 15, wherein the system is part of a cellular phone.

18. The system for displaying a value of a data point on a graph of claim 15, wherein the second data point is in a dataset from the plurality of datasets that is different from the single closest dataset.

* * * * *

UNITED STATES PATENT AND TRADEMARK OFFICE
CERTIFICATE OF CORRECTION

| | |
|---|---|
| PATENT NO. | : 9,501,219 B2 |
| APPLICATION NO. | : 13/439630 |
| DATED | : November 22, 2016 |
| INVENTOR(S) | : Yoshimoto et al. |

It is certified that error appears in the above-identified patent and that said Letters Patent is hereby corrected as shown below:

In Column 10, Lines 54-60, delete "set. In some embodiments, rather than interpolating or extrapolating a data point at the intersection, the closest data point of the dataset to the intersection of the line and the graphical representation of the dataset is retrieved. One or more values of this data point may be retrieved. The values may be retrieved locally or remotely, such as from a remote database." and insert the same on Column 10, Line 53 as a continuation of the same paragraph.

In Column 17, Lines 15-16, in Claim 15, delete "input where the user input was determined to be located;" and insert -- input; --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*